United States Patent [19]
Kuss

[11] 3,753,823
[45] Aug. 21, 1973

[54] METHOD OF MANUFACTURING A WATER MATTRESS

[75] Inventor: Ralph L. Kuss, Findlay, Ohio

[73] Assignee: R. L. Kuss & Co., Inc., Findlay, Ohio

[22] Filed: Mar. 2, 1972

[21] Appl. No.: 231,289

[52] U.S. Cl. ............ 156/145, 5/348 WB, 156/217, 156/227, 156/252, 156/272, 156/289, 156/292, 156/293
[51] Int. Cl. .............................................. B31f 7/00
[58] Field of Search .................. 156/217, 272, 274, 156/226, 227, 292, 293, 145, 289; 229/30, 48 R, 48 Y, 53, 62.5; 5/348 R, 348 WB; 93/8 VB, 8 WA; 150/9

[56] References Cited
UNITED STATES PATENTS

| | | | |
|---|---|---|---|
| 3,142,431 | 7/1964 | Noble | 229/48 T X |
| 3,251,075 | 5/1966 | Saltness et al. | 5/348 R X |
| 3,498,868 | 3/1970 | Saumsiegle | 156/293 X |
| 3,367,819 | 2/1968 | Schlag | 156/227 |
| 3,490,979 | 1/1970 | Calvert et al. | 156/293 X |

Primary Examiner—Alfred L. Leavitt
Assistant Examiner—David A. Simmons
Attorney—Carl F. Schaffer, Vincent L. Barker, Jr. et al.

[57] ABSTRACT

A method of manufacturing a water filled mattress is disclosed. A vinyl chloride sheet is pattern cut to a desired configuration, folded upon itself to form an envelope having top and bottom layers and one integral continuous sidewall, and sealed around overlapping adjoining edges of the layers on three sides. The resulting lapped seams form a water-tight integral sidewall on the envelope. The new method of construction includes steps for electrically welding the lapped seams and electrically bonding sealable air outlet and water inlet fittings in the surface of the envelope.

4 Claims, 10 Drawing Figures

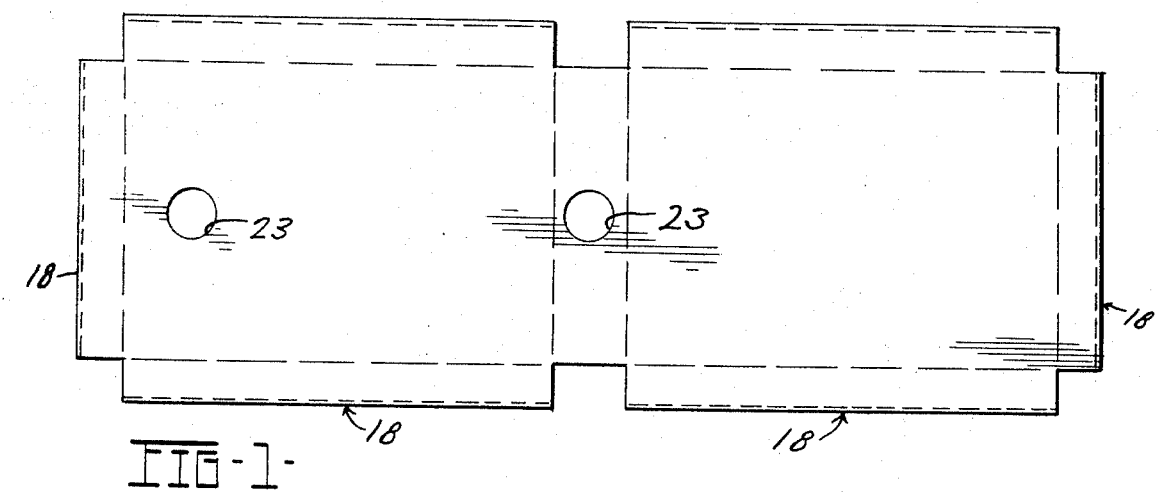
FIG-1-
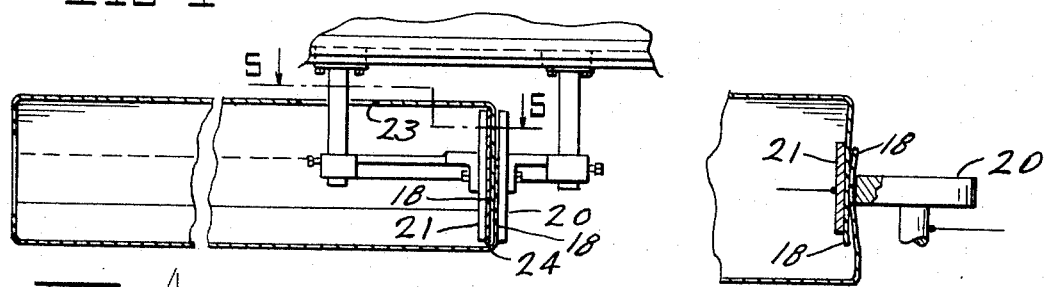
FIG-4-
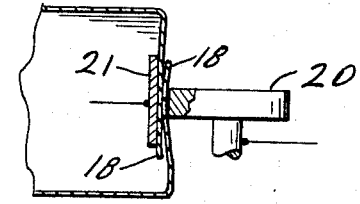
FIG-3-
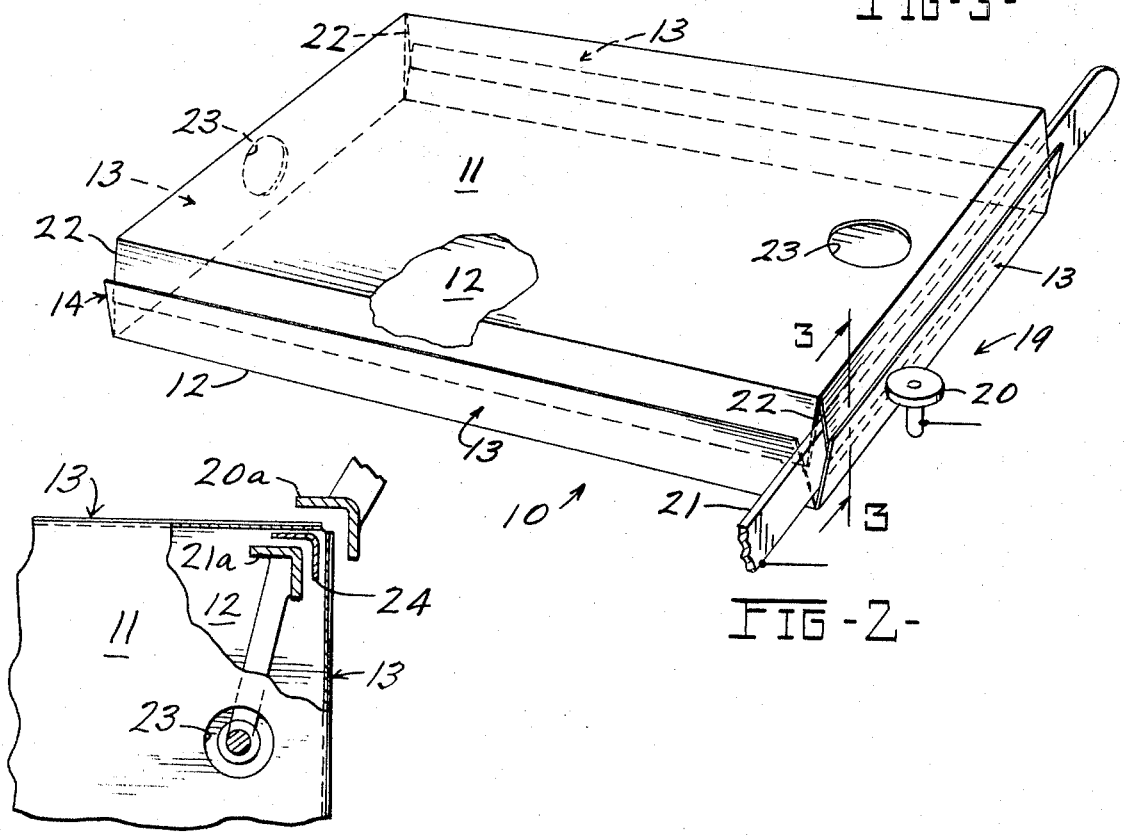
FIG-2-
FIG-5-

PATENTED AUG 21 1973 3,753,823
SHEET 2 OF 2
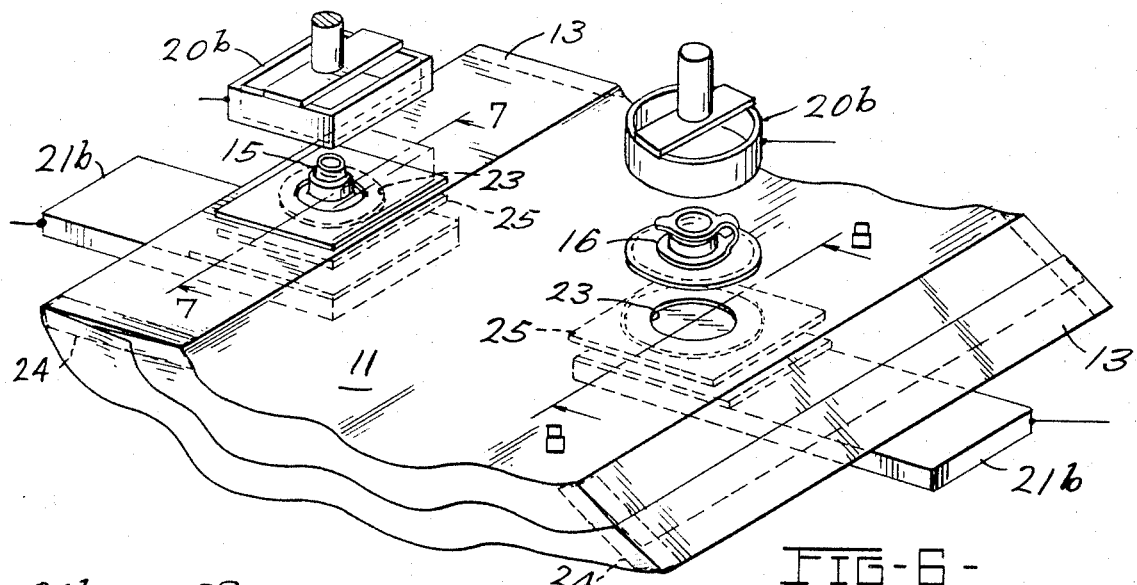
FIG-6-
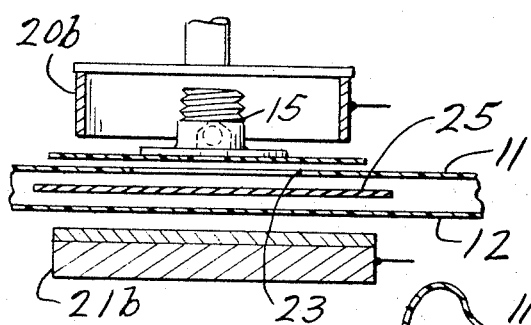
FIG-7-
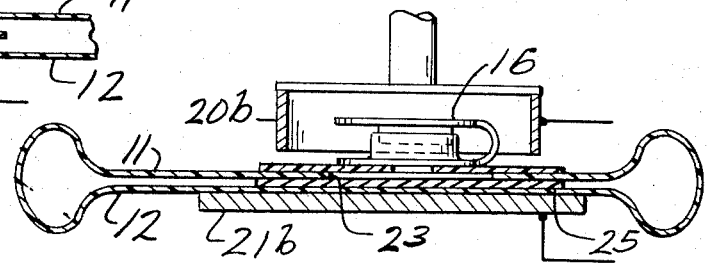
FIG-8-
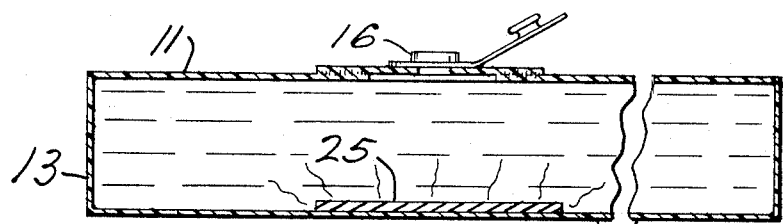
FIG-9-
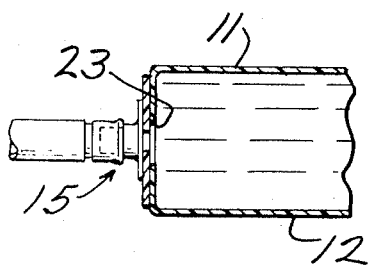
FIG-10-

METHOD OF MANUFACTURING A WATER MATTRESS

BACKGROUND OF THE INVENTION

Water mattresses, commonly termed water beds, generally comprise a mattress-sized, sealed flexible envelope for holding a quantity of water therein. The action of the water in the flexible envelope provides a desired cushioning effect to the water mattress and has been recognized for its therapeutic value in the treatment of patients under long confinement for burn or bed sore treatment.

A number of problems have arisen in the manufacture of water beds due to the great strength required to contain the mass of water within the envelope. A queen size mattress, for example, will weight over 2,000 pounds when filled with water.

It has been found that the strongest and most economical construction of the water mattress is attained through employment of a flexible vinyl sheet which is cut to the configuration of the mattress, folded upon itself to form a top and bottom surface, and sealed with a lapped seam around the adjoining edges of the envelope to form a watertight integral sidewall. The bonding of the seams is effected through employment of an electronic welding device commonly used to bond vinyl surfaces together.

The electronic bonding process is generally carried out by placing the surfaces of vinyl to be bonded between the electrodes of the bonding unit. The vinyl surfaces are then sandwiched between the electrodes and the resulting current flow from one electrode to the other through the vinyl sheets creates enough heat in the vinyl material to cause softening and bonding. The vinyl utilized in these bonding processes is generally polyvinyl chloride. However, other thermoplastic materials are suitable for the bonding operation. The preferred embodiment is described in terms of a PVC sheet with the understanding that other suitable materials can be used with the method.

Due to the unique construction of the water filled mattress, wherein a completely sealed three-dimensional envelope with fittings for introduction of water within the envelope are required, it is difficult to place the bonding electrode inside the envelope behind the lapped seams or in the vicinity of the bonded-in-place fittings to effect a seal without bonding the opposite surfaces of the envelope together.

SUMMARY OF THE INVENTION

The invention comprises a method of manufacturing a water mattress comprising a plastic envelope having a top surface, a bottom surface, vertical sidewalls, overlapping seams along said vertical sidewalls, a sealed water inlet connection and a sealed air outlet connection. The steps comprise pattern cutting a plastic sheet to desired connections, folding the sheet upon itself, and sealing the three overlapping edges or sides of the resulting upper and lower segments of the sheet to form a watertight three-dimensional envelope. The sealing is effected by a double-electrode bonding apparatus. One of the electrodes is placed within the envelope and behind the overlapping edges of the plastic sheet. The second electrode is placed against the overlapping edges on the outside of the envelope. The sandwiching of the overlapping edges between the two electrodes effects bonding in a manner well known to those skilled in the art. The electrode, or mandrel, to be placed on the interior of the mattress is inserted through vertical slits cut in the corners of the envelope. Once the sidewalls of the mattress are completely sealed, the vertical slits are sealed by placing another mandrel within the envelope, adjacent the slits through openings in the top surface for receiving a valved air outlet connection and a water inlet connection. The adjoining edges of the slits are then overlapped with a vinyl strip. The outside sealing electrode is placed against the inserted sealing mandrel.

The final seal of the envelope is effected by bonding the air outlet and water inlet connections to the mattress. The sealed air outlet and water inlet are placed over the complementary openings cut in the top sheet and sidewall. A buffer sheet of a non-compatible material which could be water soluble, such as a polyvinyl alcohol, is placed immediately beneath the openings. The entire envelope construction is then squeezed between welding electrodes to effect bonding of the vinyl sealed connections to the top sheet and sidewall. Because the buffer sheet is non-compatible and non-adhering with the remainder of the envelope, the interior surfaces of the envelope will not be bonded together. If the buffer sheet is soluble in water, it will dissipate after the mattress has been filled with water; otherwise it will remain inside the mattress.

DESCRIPTION OF THE DRAWINGS

FIG. 1 is a plan view of a sheet of plastic material cut to form a water mattress;

FIG. 2 is a schematic view in perspective of the water mattress envelope formed from the sheet of FIG. 1, showing the sealing mechanism in position on one seam;

FIG. 3 is a cross-sectional view in elevation, taken along line 3—3 of FIG. 2;

FIG. 4 is a partial cross-sectional view in elevation showing the manner of sealing the corners of the envelope;

FIG. 5 is a plan view in cross-section, taken along line 5—5 of FIG. 4;

FIG. 6 is a schematic view in perspective of the apparatus and manner of sealing the air and water valves in the envelope;

FIG. 7 is a schematic cross-sectional view in elevation of a valve seal construction prior to being completed;

FIG. 8 is a view similar to FIG. 7 showing the valve being sealed in place;

FIG. 9 is a cross-sectional view of the completed valve construction with the water mattress in use; and FIG. 10 shows the other valve construction on the completed mattress.

DESCRIPTION OF THE PREFERRED EMBODIMENT

Referring to the drawings, a water mattress 10 having a top surface 11, a bottom surface 12 and vertical sidewalls 13 is shown. Overlapping seams 14 along the vertical sidewalls 13 render the mattress 10 a three-dimensional, watertight envelope. A sealed water inlet connection 15 and a sealed air outlet connection 16 are connected to one of the vertical sidewalls 13 and the top surface 11, respectively.

The water mattress 10 is manufactured by pattern cutting a plastic sheet 17 into the configuration shown in FIG. 1. The sheet 17 is folded upon itself to effect a mattress-sized body having the top surface 11 and the bottom surface 12.

As shown in FIG. 2, the overlapping edges 18 of the top surface and the bottom surface 12 are sealed together with a double-electrode bonding apparatus 19 having an outside electrode 20 and an inside electrode 21 within the mattress 10 envelope. As shown in FIG. 2, the inside electrode 21 is inserted within the mattress 10 through vertical slits 22 in each corner of the envelope. The electrodes 20 and 21 are placed against opposite sides of the overlapping edges 18, thus sandwiching the edges between the electrodes 20 and 21. Sealing is effected by energizing the electrodes 20 and 21 and progressively moving the movable electrode 20 along the seam, thereby creating a sufficient amount of heat to soften the overlapping edges 18 of the thermoplastic material to effect bonding therebetween. If a fixed electrode is used for the outside, the seam can be sealed in a similar manner. Once the overlapping edges 18 on all three sides are completely sealed in this manner, the vertical slits 22 are then sealed.

As shown in FIGS. 4 and 5, the sealing of the vertical slits 22 is effected by placing another electrode 21a within the mattress 10 through the opening 23 in the top surface 11 for receiving the valved air outlet connection 16. A vinyl strip 24 is placed within the mattress adjacent the interior electrode 21a. The adjoining edges of the vertical slits 22 are then overlapped and placed between the outside and inside electrodes 20a and 21a to effect a seal in the same manner as the overlapping seams 14 are sealed. The electrodes 20a and 21a can be shaped as shown or can be flat.

Referring to FIGS. 6-8, the final seal of the envelope is effected by bonding the air outlet and water inlet connections 16 and 15, respectively, to the mattress 10. The air outlet connection 16 and water inlet connection 15 are placed over complementary openings 23 in the top and sidewall. A buffer sheet 25 of polyvinyl alcohol or other non-compatible material is placed within the mattress 10, immediately adjacent the openings 23. The entire mattress 10 construction, including the air outlet and water inlet connections 16 and 15, is then sandwiched between another pair of shaped welding electrodes 20b and 21b to effect bonding of the connections 15 and 16 over their respective opening 23. As seen in FIG. 6, the electrodes 20b and 21b can be shaped to create a closed rectangular or annular sealed bond around the valve itself. As previously stated, the buffer sheet 25 prevents the bonding of the thermoplastic top surface 11 and bottom surface 12 together when the connections 15 and 16 are bonded in place as illustrated above.

The resulting mattress 10 is then ready to be filled with water and used. If the buffer sheet 25 is water soluble, the sheet 25 will dissolve over a period of use of the mattress.

It will be seen that the above described method solves the unusual problem of completely sealing a watertight envelope in a unique manner and can be performed with a minimum of especially designed jigs and other equipment. It's advantages will of course be useful in the manufacture of similar sealed envelopes and shapes other than water beds. Various other advantages and uses of the method will be apparent to those skilled in the art and can be made without departing from the spirit and scope of the attached claims.

I claim:

1. A method of manufacturing a totally enclosed envelope of a thermoplastic sheet material having a top surface, a bottom surface, vertical sidewalls, overlapping seams along said vertical sidewalls and at least one inlet connection, the steps comprising:
   1. cutting a thermoplastic sheet into a generally rectangular shape;
   2. folding said cut sheet upon itself to form an envelope having a first layer and a second layer defining said top surface and said bottom surface;
   3. cutting an opening in one of said layers for receiving said inlet;
   4. overlapping a first set of edges of said first and second layers for forming a lapped seam along one side of said envelope;
   5. inserting a sealing means between said first and second layers behind said lapped seam, and sealing said seam along said means with a welding electrode, and removing said means;
   6. repeating steps (4) and (5) above on the remaining two sides of said envelope;
   7. sealing the vertical corners between adjacent sides of said envelope; and
   8. sealing an inlet connection within said opening to provide a watertight envelope.

2. The method of claim 1 wherein said inlet connection is sealed to said one layer by.
   9. inserting a buffer sheet of a non-compatible material through said opening between said first and second layers;
   10. placing said inlet and connection over said opening;
   11. sandwiching said envelope, inlet and buffer sheet interadjacent said layers and below said inlet between adjacent poles of an electronic welding apparatus to bond said inlet over said opening in said one layer; whereby said buffer sheet between said first and second layers prevent a sealing of said first layer to said second layer.

3. A method of manufacturing a totally enclosed envelope of a thermoplastic sheet material having a top surface, a bottom surface, vertical sidewalls, overlapping seams along said vertical sidewalls and at least one inlet connection, the steps comprising:
   1. cutting a thermoplastic sheet into a generally rectangular shape;
   2. folding said cut sheet upon itself to form an envelope having a first layer and a second layer defining said top surface and said bottom surface;
   3. cutting an opening in one of said layers for receiving said inlet;
   4. overlapping a first set of edges of said first and second layers for forming a lapped seam along one side of said envelope;
   5. inserting a sealing means between said first and second layers behind said lapped seam, and sealing said seam along said means with a welding electrode and removing said means;
   6. repeating steps (4) and (5) above on the remaining two sides of said envelope;
   7. overlapping adjoining edges of said vertical slits with a vertical strip of thermoplastic material to form a lapped seam therealong;
   8. inserting an electric sealing means through said opening in said one layer, between said first and second layers, behind said lapped seams of said vertical slits, and sealing said seams along said means with a welding electrode and removing said means;
9. inserting a buffer sheet of a non-compatible material through said opening for receiving said inlet connections, between said first and second layers;
10. placing said inlet connection over said opening in said first layer and;
11. placing said envelope over one pole of a welding electrode under said opening, sealing said connection to said opening in said one layer with a second welding electrode placed over said connection;

whereby said polyvinyl sheet between said first and second layers accommodates sealing of said connections to said first layer but prevents a corresponding sealing of said first layer to said second layer and whereby a sealed watertight fillable mattress is formed.

4. A method of sealing an inlet connection having an integrally formed sealing flange upon an aperture in one side of an envelope of a thermoplastic sheet material comprising the steps of:
 1. placing a buffer sheet of a non-compatible material between the two sides of said envelope and under said aperture;
 2. placing said inlet connection over said aperture upon said one side with said flange surrounding said aperture;
 3. sandwiching said flange and said envelope side with the interadjacent buffer sheet between a pair of sealing electrodes extending around said flange to encompass said aperture; and
 4. activating said sealing electrode to seal said flange to said one side with said buffer sheet preventing said envelope sides from sealing to one another.

* * * * *